US012521140B2

(12) United States Patent
Rowe

(10) Patent No.: US 12,521,140 B2
(45) Date of Patent: Jan. 13, 2026

(54) ATHERECTOMY DEVICES INCLUDING POSITIVE AND NEGATIVE RAKE ANGLE CUTTING BLADES

(71) Applicant: KONINKLIJKE PHILIPS N.V., Eindhoven (NL)

(72) Inventor: Douglas Rowe, San Jose, CA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 530 days.

(21) Appl. No.: 17/611,672

(22) PCT Filed: May 16, 2020

(86) PCT No.: PCT/EP2020/063743
§ 371 (c)(1),
(2) Date: Nov. 16, 2021

(87) PCT Pub. No.: WO2020/234203
PCT Pub. Date: Nov. 26, 2020

(65) Prior Publication Data
US 2022/0211409 A1 Jul. 7, 2022

Related U.S. Application Data

(60) Provisional application No. 62/849,349, filed on May 17, 2019.

(51) Int. Cl.
*A61B 17/3207* (2006.01)
(52) U.S. Cl.
CPC ......... *A61B 17/320758* (2013.01); *A61B 2017/320775* (2013.01)

(58) Field of Classification Search
CPC ............ A61B 17/320758; A61B 2017/320775
See application file for complete search history.

(56) References Cited

U.S. PATENT DOCUMENTS 4,790,813 A 12/1988 Kensey
6,632,230 B2 * 10/2003 Barry ............. A61B 17/320758
606/159

(Continued)

FOREIGN PATENT DOCUMENTS

CN 206881851 U 1/2018
WO 2014/059150 4/2014
WO 2015/017144 2/2015

OTHER PUBLICATIONS

International Search Report and Written Opinion dated Jul. 20, 2020 for International Application No. PCT/EP2020/063743 filed May 16, 2020.

*Primary Examiner* — Tuan V Nguyen

(57) ABSTRACT

An atherectomy device includes a catheter that is coupled to a handle. The catheter includes an outer sheath and a drive shaft carried within and rotatable relative to the outer sheath. A cutter assembly is coupled to and extends distally relative to the outer sheath. The cutter assembly includes a housing coupled to and extending distally from the outer sheath. A proximal cutting element is rotatably carried by the housing, and the proximal cutting element is coupled to and extends distally from the drive shaft. The proximal cutting element includes at least one proximal cutting blade, and the at least one proximal cutting blade has a negative rake angle. A distal cutting element is rotatable with the proximal cutting element relative to the housing. The distal cutting element includes at least one distal cutting blade, and the at least one distal cutting blade has a positive rake angle.

20 Claims, 7 Drawing Sheets

(56) References Cited

U.S. PATENT DOCUMENTS

| | | | |
|---|---|---|---|
| 2012/0109171 A1* | 5/2012 | Zeroni | A61B 17/320758 606/159 |
| 2013/0096587 A1* | 4/2013 | Smith | A61B 17/320758 606/159 |
| 2016/0242808 A1 | 8/2016 | Escudero | |

* cited by examiner

ATHERECTOMY DEVICES INCLUDING POSITIVE AND NEGATIVE RAKE ANGLE CUTTING BLADES

CROSS REFERENCE TO RELATED APPLICATIONS

This application is the U.S. National Phase application under 35 U.S.C. § 371 of International Application No. PCT/EP2020/063743 filed May 16, 2020, which claims the benefit of U.S. Provisional Patent Application No. 62/849,349 filed May 17, 2019. These applications are hereby incorporated by reference herein.

FIELD OF THE DISCLOSURE

The devices and methods described herein generally relate to treatment of occluded body lumens, such as the removal of occlusive material from a blood vessel or other body parts.

BACKGROUND

Peripheral and interventional cardiology is a medical specialty that relates to treatment of various forms of cardiovascular disease, including coronary artery disease and peripheral vascular disease. Coronary artery disease and peripheral vascular disease can arise due to the narrowing of the arteries by atherosclerosis (also called arteriosclerosis). Coronary artery disease generally affects arteries of the heart-arteries that carry blood to cardiac muscles and surrounding tissue. Peripheral vascular disease refers to various diseases of the vascular system outside the heart and brain, which carries blood, for example, to the legs.

Atherosclerosis commonly affects the medium and large arteries, and may occur when fat, cholesterol, and other substances build up on the walls of arteries and form fleshy or hard/calcified structures called plaques/lesions. As plaque forms within an arterial wall, the artery may narrow and become less flexible, which may make it more difficult for blood to flow therethrough. In the peripheral arteries, the plaque is typically not localized, but can extend in length along the axis of the artery for as much as 10 mm or more (in some instance up to 400 mm or more).

Pieces of plaque can break off and move through the affected artery to smaller blood vessels, which may in some instances block them and may result in tissue damage or tissue death (embolization). In some cases, the atherosclerotic plaque may be associated with a weakening of the wall of the affected artery, which can lead to an aneurysm. Minimally invasive surgeries may be performed to remove plaque from arteries in an effort to alleviate or help prevent the complications of atherosclerosis.

A number of interventional surgical methodologies may be used to treat atherosclerosis. In balloon angioplasty, for example, a physician may advance a collapsed, intravascular balloon catheter into a narrowed artery, and may inflate the balloon to macerate and/or displace plaque against the vessel wall. A successful angioplasty may help reopen the artery and allow for improved blood flow. Often, balloon angioplasty is performed in conjunction with the placement of a stent or scaffold structure within the artery to help minimize re-narrowing of the artery. Balloon angioplasty, however, can stretch the artery and induce scar tissue formation, while the placement of a stent can cut arterial tissue and also induce scar tissue formation. Scar tissue formation may lead to restenosis of the artery. In some instances, balloon angioplasty can also rip the vessel wall.

Atherectomy is another treatment methodology for atherosclerosis, and involves the use of an intravascular device to mechanically remove (that is, debulk) plaque from the wall of the artery. Atherectomy devices may allow for the removal of plaque from the wall of an artery, reducing the risk of stretching, cutter, or dissecting the arterial wall and causing tissue damage that leads to restenosis. In some instances, atherectomy may be used to treat restenosis by removing scar tissue.

Unfortunately, some atherectomy devices suffer from structural and performance limitations. For example, the cutting elements or assemblies of some atherectomy devices cannot adequately treat total occlusions. Accordingly, it is desirable to provide improved atherectomy devices and methods.

SUMMARY

The present disclosure presents an atherectomy device. The atherectomy device includes a handle configured to be manipulated by a user. A catheter is coupled to the handle. The catheter includes an outer sheath and a drive shaft, wherein the drive shaft is disposed within and rotatable relative to the outer sheath. A cutter assembly is coupled to and extends distally relative to the outer sheath. The cutter assembly includes a housing coupled to and extending distally from the outer sheath. A proximal cutting element is rotatably carried by the housing, and the proximal cutting element is coupled to and extends distally from the drive shaft. The proximal cutting element includes at least one proximal cutting blade, and the at least one proximal cutting blade has a negative rake angle. A distal cutting element is rotatable with the proximal cutting element relative to the housing. The distal cutting element includes at least one distal cutting blade, and the at least one distal cutting blade has a positive rake angle.

The atherectomy device according to the previous paragraph, wherein the proximal cutting element comprises a plurality of proximal cutting blades, each of the plurality of proximal cutting blades having the negative rake angle.

The atherectomy device according to any of the previous paragraphs, wherein the distal cutting element comprises a plurality of distal cutting blades, each of the plurality of distal cutting blades having the positive rake angle.

The atherectomy device according to any of the previous paragraphs, wherein the negative rake angle is in a range of 8 degrees to 24 degrees.

The atherectomy device according to any of the previous paragraphs, wherein the negative rake angle is substantially 16 degrees.

The atherectomy device according to any of the previous paragraphs, wherein the positive rake angle is in a range of 40 degrees to 70 degrees.

The atherectomy device according to any of the previous paragraphs, wherein the positive rake angle is substantially 55 degrees.

The present disclosure also presents an atherectomy device. The atherectomy device includes a handle configured to be manipulated by a user. A catheter is coupled to the handle. The catheter includes an outer sheath and a drive shaft, wherein the drive shaft is disposed within and rotatable relative to the outer sheath. A cutter assembly is coupled to and extends distally relative to the outer sheath. The cutter assembly includes a housing coupled to and extending distally from the outer sheath. A proximal cutting element is rotatably carried by the housing about a rotational axis in a rotational direction. The proximal cutting element is coupled to and extends distally from the drive shaft. A proximal cutting element is carried by the housing, and the proximal cutting element is configured to cut occlusive material when rotating relative to the housing about a rotational axis in a rotational direction. The proximal cutting element is coupled to and extends distally from the drive shaft. The proximal cutting element includes at least one proximal cutting blade. The at least one proximal cutting blade has a first rake angle, and the first rake angle extends from (i) a radius from the rotational axis to a most radially distant edge of the at least one proximal cutting blade to (ii) a tangent from an inner face of the at least one proximal cutting blade at the most radially distant edge. The first rake angle is in the opposite direction as the rotational direction. A distal cutting element is coupled to the proximal cutting element. The distal cutting element is configured to cut occlusive material when rotating with the proximal cutting element relative to the housing about the rotational axis in the rotational direction. The distal cutting element includes at least one distal cutting blade. The at least one distal cutting blade has a second rake angle, and the second rake angle extends from (iii) a radius from the rotational axis to a most radially distant edge of the at least one distal cutting blade to (iv) a tangent from an inner face of the at least one distal cutting blade at the most radially distant edge of the at least one distal cutting blade. The second rake angle is in the same direction as the rotational direction.

The atherectomy device according to the previous paragraph, wherein the proximal cutting element comprises a plurality of proximal cutting blades, each of the plurality of proximal cutting blades having the first rake angle.

The atherectomy device according to any of the previous paragraphs, wherein the distal cutting element comprises a plurality of distal cutting blades, each of the plurality of distal cutting blades having the second rake angle.

The atherectomy device according to any of the previous paragraphs, wherein the first rake angle is in a range of 8 degrees to 24 degrees.

The atherectomy device according to any of the previous paragraphs, wherein the first rake angle is substantially 16 degrees.

The atherectomy device according to any of the previous paragraphs, wherein the second rake angle is in a range of 40 degrees to 70 degrees.

The atherectomy device according to any of the previous paragraphs, wherein the second rake angle is substantially 55 degrees.

The atherectomy device according to any of the previous paragraphs, wherein the housing comprises an inner surface, and the inner surface comprises at least one shearing element.

The atherectomy device according to any of the previous paragraphs, wherein the inner surface comprises a plurality of shearing elements.

The atherectomy device according to any of the previous paragraphs, wherein the at least one shearing element comprises a channel.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (for example, $X_1$ and $X_2$) as well as a combination of elements selected from two or more classes (for example, $Y_1$ and $Z_o$).

The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

The term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
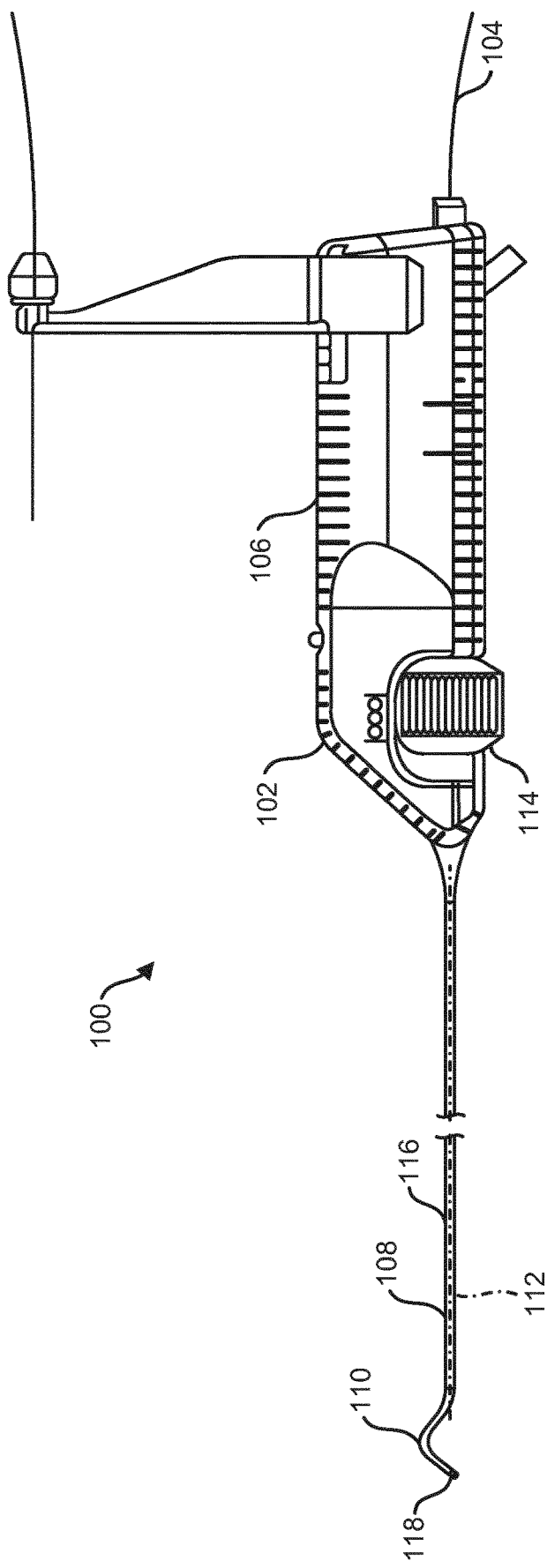
FIG. 1 is a side view of an atherectomy system according to an embodiment of the present disclosure.

The present disclosure relates generally to devices, systems, and methods for mechanical atherectomy. Referring to FIG. 1, there is shown an exemplary embodiment of the atherectomy systems described herein. The atherectomy system 100 includes an intravascular atherectomy device 102 and a guide wire 104 over which the atherectomy device 102 may be deployed. In some embodiments, the guide wire 104 is silicon-coated or non-coated (bare), or otherwise free of a PTFE coating. Atherectomy systems according to some embodiments of the present disclosure comprise a guide wire 104 that includes a PTFE coating, or atherectomy systems according to some embodiments of the present disclosure lack a guide wire 104.

With continued reference to FIG. 1, the atherectomy device 102 generally includes a handle 106 and a catheter 108. The handle 106 is configured to be grasped and manipulated by a user (for example, a medical professional) during an atherectomy procedure. The catheter 108 is coupled to and extends distally relative to the handle 106. The catheter 108 is configured to be positioned in the vasculature of a subject (for example, a patient) during an atherectomy procedure to facilitate removal of occlusive material (for example, plaque) therefrom. In some embodiments and as illustrated, a distal portion 110 of the catheter 108 has a curved shape or configuration. In some embodiments, the distal portion 110 of the catheter 108 normally has a curved configuration ("normally" being understood as the catheter 108 not being subjected to any external contact forces due to, for example, contact with blood vessel walls) and may be deflected to other configurations. In other embodiments, the distal portion 110 of the catheter 108 normally has a straight shape or configuration and may be deflected to other configurations. In some embodiments, the catheter 108 is selectively rotatable about a catheter 108 rotational axis 112 relative to the handle 106 to facilitate appropriately positioning and or "sweeping" the distal portion 110 of the catheter 108 during an atherectomy procedure. In some embodiments and as illustrated, the handle 106 carries a rotatable knob or dial 114 for selectively rotating the catheter 108 relative to the handle 106. The catheter 108 includes an outer sheath 116, and the outer sheath 116 couples to a cutter assembly 118 that extends distally therefrom. The cutter assembly 118 is described in further detail below.

Figure 2A:
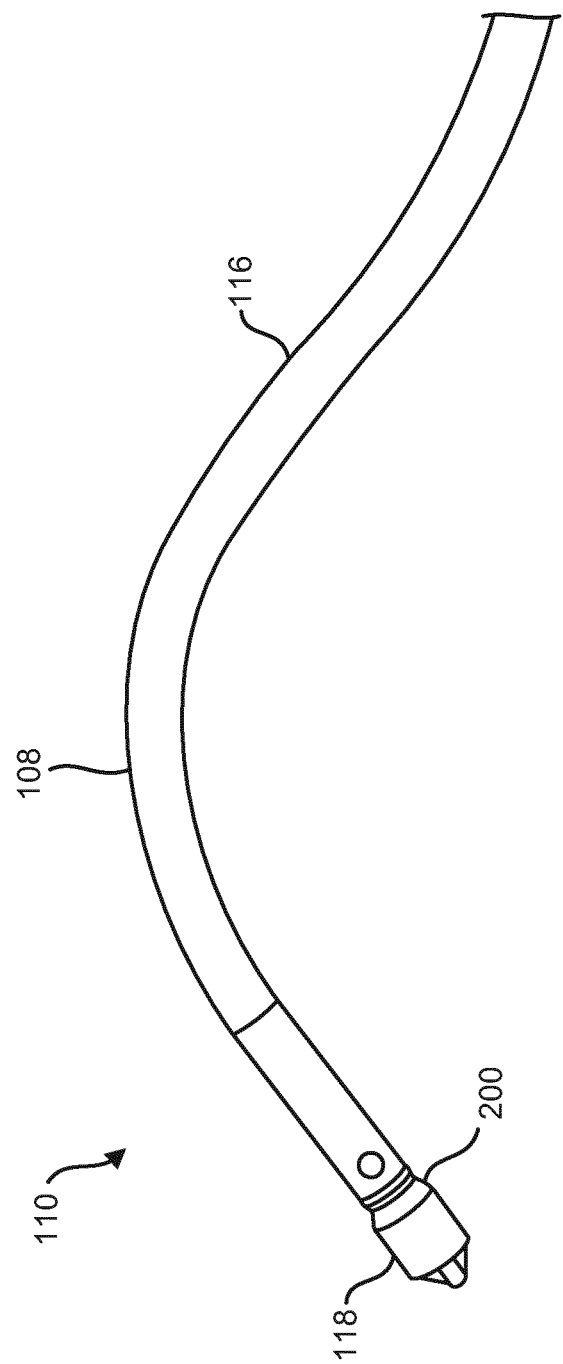
FIG. 2A is a detail side view of a distal portion of the atherectomy system of FIG. 1.
Figure 2B:
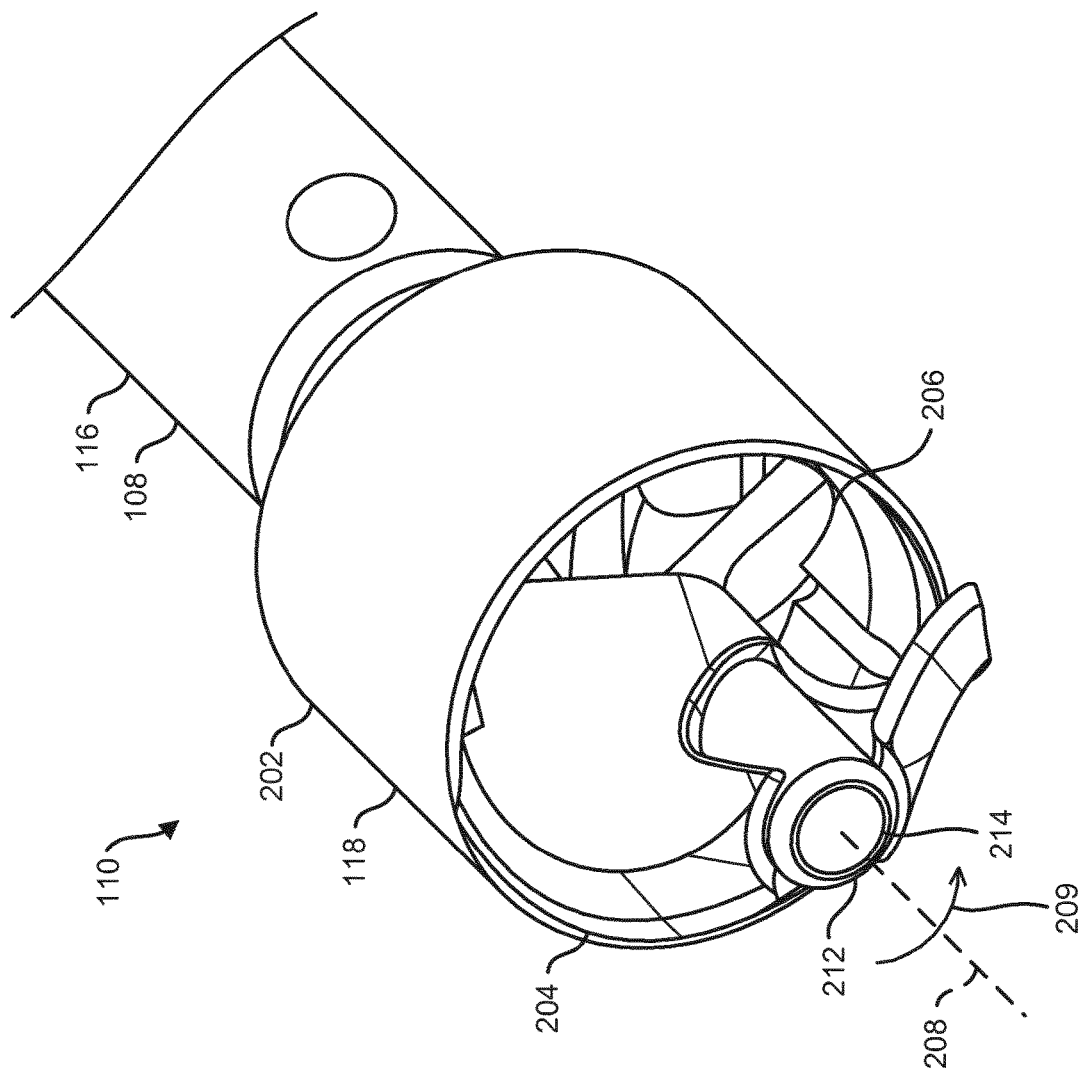
FIG. 2B is a detail perspective view of the distal portion of the atherectomy system of FIG. 1.
Figure 2C:
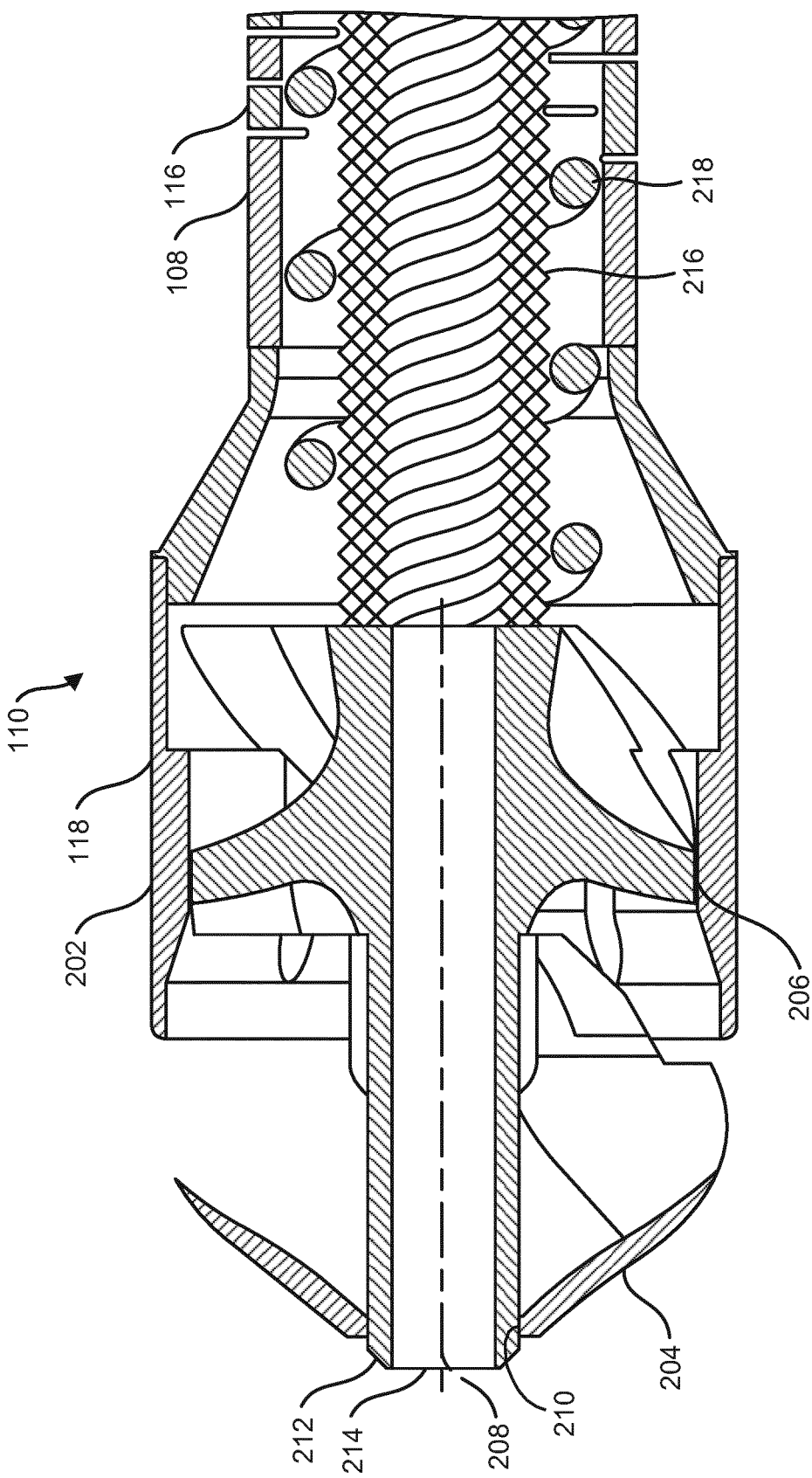
FIG. 2C is a detail transverse sectional view of the distal portion of the atherectomy system of FIG. 2A.

FIGS. 2A-2C illustrate the distal portion 110 of the catheter 108, including, among other components, the outer sheath 116 and the cutter assembly 118. The cutter assembly 118 includes a ferrule 200 that couples to the outer sheath 116 and extends distally therefrom. The cutter assembly 118 further includes a housing 202 that couples to the ferrule 200 and extends distally therefrom. The housing 202 rotatably carries cutting elements. Referring specifically to FIGS. 2B-2C, the housing 202 rotatably carries a first, or distal, cutting element 204 and a second, or proximal, cutting element 206. Rotation of the first cutting element 204 and the second cutting element 206 about a rotation axis 208 in a rotational direction 209 relative to the housing 202 causes the cutting elements 204, 206 to cut occlusive material and convey the occlusive material into the housing 202 (a process also referred to as "debulking").

Still referring to FIGS. 2B-2C, the first cutting element 204 generally extends distally from the second cutting element 206 and the housing 202. The first cutting element 204 includes a central opening 210 (see FIG. 2C) for coupling to the second cutting element 206. The second cutting element 206 is generally disposed within the housing 202 and, in some embodiments and as illustrated, may be completely disposed within the housing 202. The second cutting element 206 is also generally disposed proximally from the first cutting element 204, although the second cutting element 206 includes a shaft or stem 212 that is received in the central opening 210. The stem 212 may couple to the first cutting element 204 in various manners. For example, the stem 212 may couple to the first cutting element 204 via welding. In some embodiments and as illustrated, the stem 212 extends distally relative to the first cutting element 204. The stem 212 includes an inner lumen 214 for receiving a guide wire (shown elsewhere).

Referring specifically to FIG. 2C, the atherectomy device 102 further includes a rotatable drive shaft 216 that couples the first cutting element 204 and the second cutting element 206 to a prime mover (for example, a motor carried by the handle 106—not shown). That is, the prime mover rotates the drive shaft 216, which in turn rotates the first cutting element 204 and the second cutting element 206 to facilitate cutting occlusive material and conveying the occlusive material into the housing 202. In some embodiments, the cutter assembly 118 captures the cut occlusive material from the blood without the use of vacuum aspiration. In other embodiments, vacuum aspiration may assist capture of the cut occlusive material.

With continued reference to FIG. 2C, in some embodiments, the atherectomy device 102 also includes an internal conveyor 218 that is coupled to and rotates with the drive shaft 216. As occlusive material is conveyed into the cutter housing 202 by the first cutting element 204 and the second cutting element 206, the conveyor 218 displaces the cut occlusive material proximally through the catheter 108 for discharge outside the subject's body. In some embodiments, this conveyance may occur without the use of vacuum aspiration assistance. In other embodiments, vacuum aspiration may assist conveyance of the cut occlusive material.

Figure 3A:
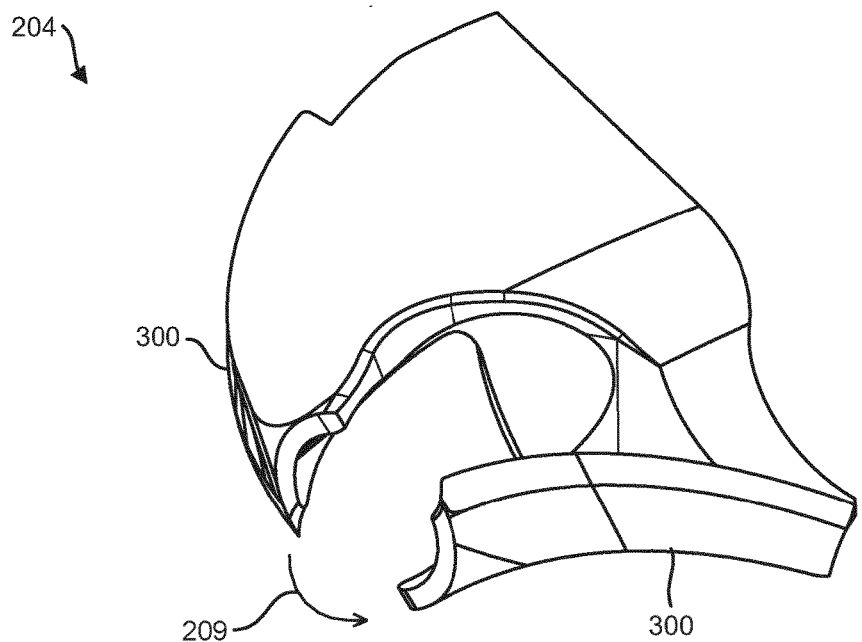
FIG. 3A is a perspective view of a distal cutting element of the atherectomy system of FIG. 1.
Figure 3B:
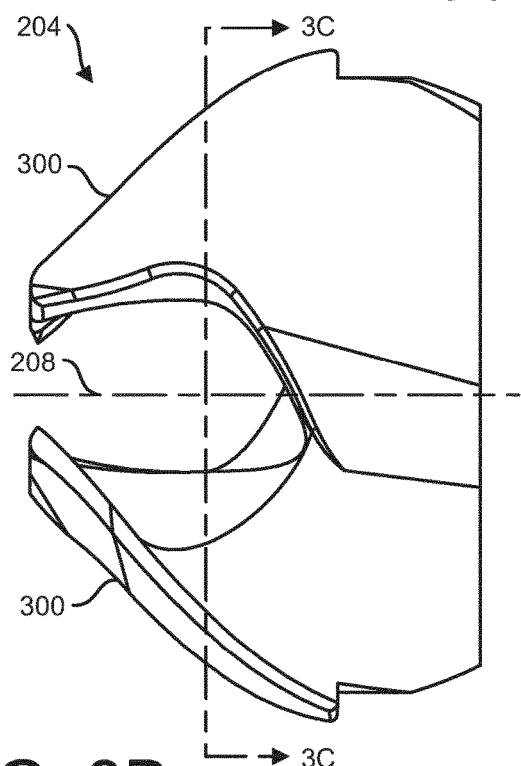
FIG. 3B is a side view of the distal cutting element of FIG. 3A.
Figure 3C:
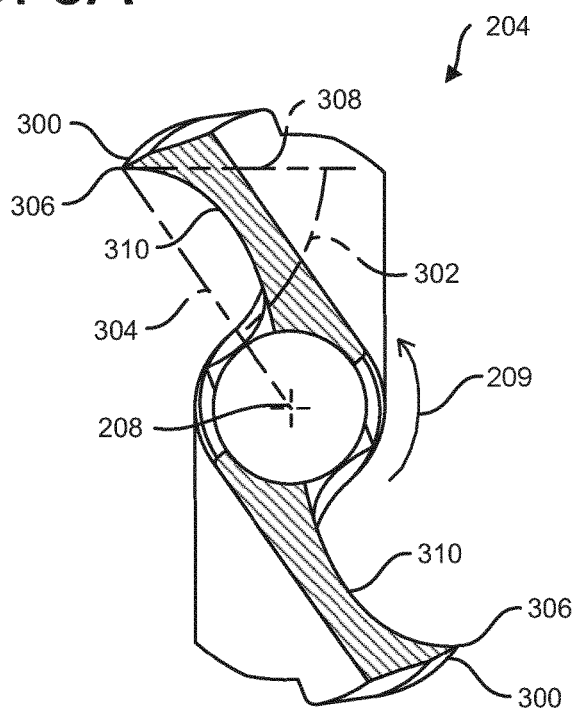
FIG. 3C is a cross sectional view of the distal cutting element along line 3C-3C of FIG. 3B.

Referring now to FIGS. 3A-3C, the first cutting element 204 includes one or more first, or distal, cutting flutes or blades 300 that extend distally relative to the housing 202. In some embodiments and as illustrated, the first cutting element 204 includes two cutting blades 300. In some embodiments and as illustrated, one or more of the first cutting blades 300 extend helically relative to the rotation axis 208 of the first cutting element 204 and the second cutting element 206. In some embodiments and referring specifically to FIG. 3C, one or more of the first cutting blades 300 have a positive rake angle 302. That is, one or more of the first cutting blades 300 has a rake angle 302 that is measured between an imaginary radius 304 extending from the rotation axis 208 of the first cutting element 204 to a most radially distant edge 306 of the cutting blade 300 and a tangent 308 from an inner face 310 of the cutting blade 300 at the most radially distant edge 306. The rake angle 302 is in the same direction as the rotational direction 209 of the first cutting element 204 and the second cutting element 206 about the rotation axis 208. In some embodiments, the rake angle 302 is in a range of 30 degrees to 80 degrees. In some embodiments, the rake angle 302 is in a range of 35 degrees to 75 degrees. In some embodiments, the rake angle 302 is in a range of 40 degrees to 70 degrees. In some embodiments, the rake angle 302 is in a range of 45 degrees to 65 degrees. In some embodiments, the rake angle 302 is in a range of 50 degrees to 60 degrees. In some embodiments, the rake angle 302 is substantially 55 degrees (that is, 55 degrees±2.5 degrees).

Figure 4A:
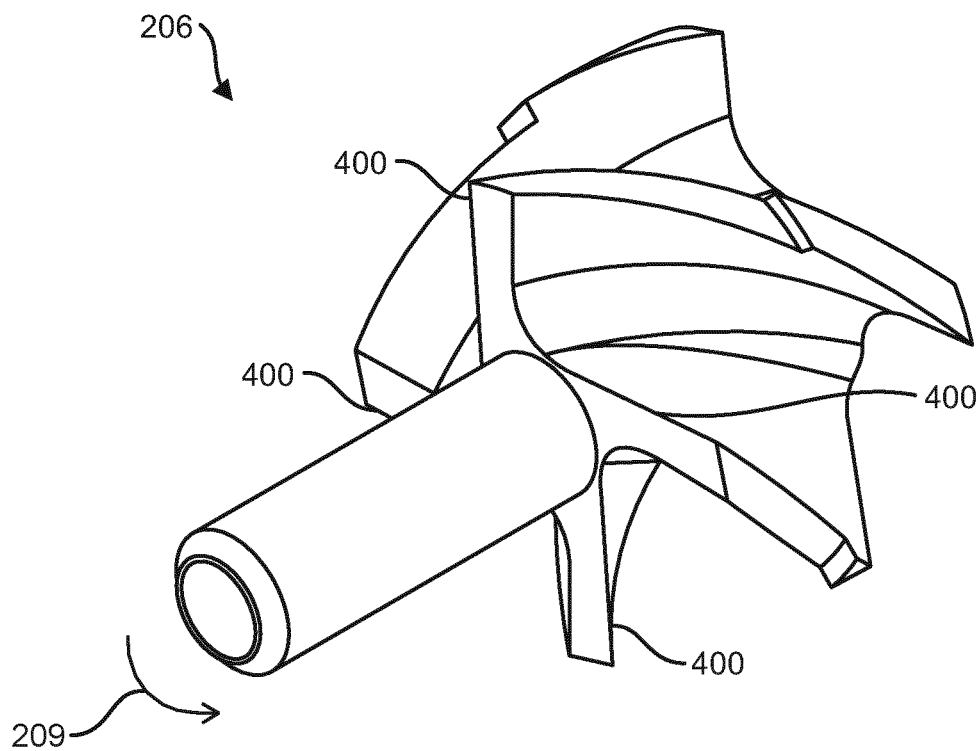
FIG. 4A is a perspective view of a proximal cutting element of the atherectomy system of FIG. 1.
Figure 4B:
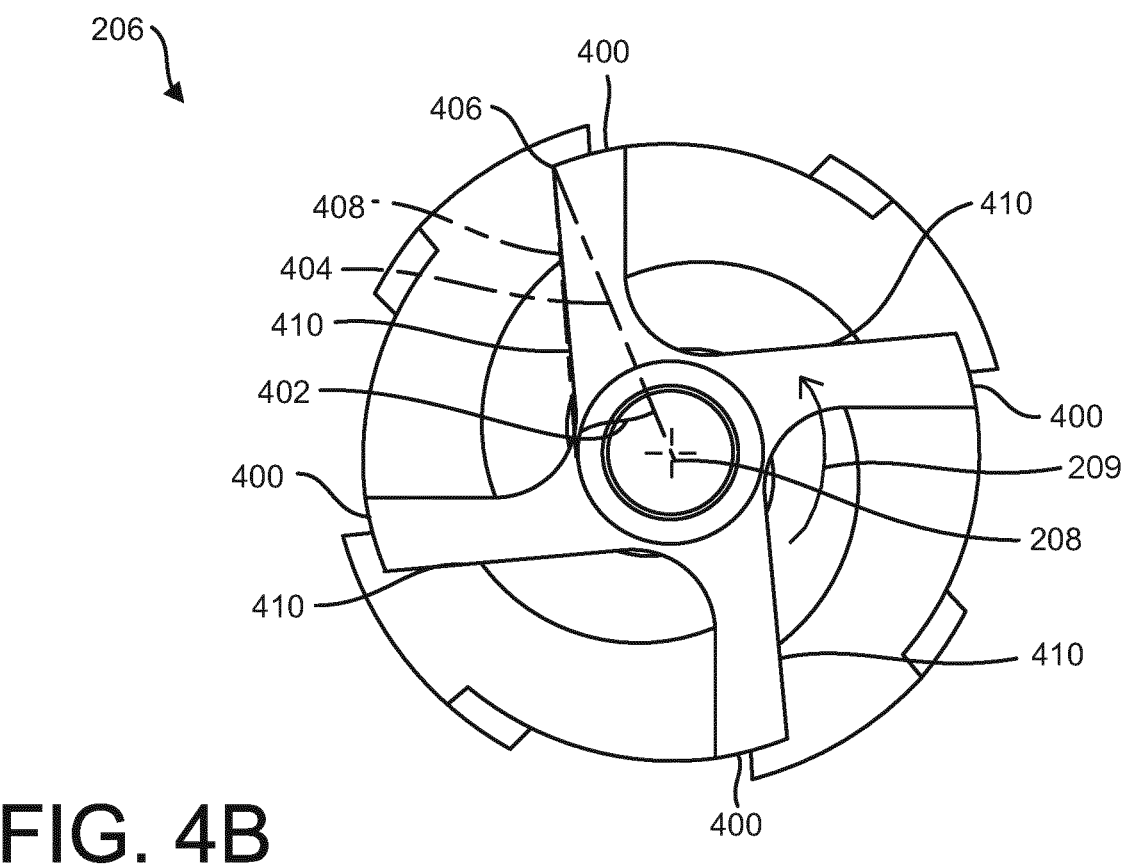
FIG. 4B is a front view of the proximal cutting element of FIG. 4A.

Referring now to FIGS. 4A-4B, the second cutting element 206 includes one or more second, or proximal, cutting flutes or blades 400. In some embodiments, the second cutting element 206 has two times the number of blades 400 as the first cutting element 204. In some embodiments and as illustrated, the second cutting element 206 includes four cutting blades 400. In some embodiments and as illustrated, one or more of the second cutting blades 400 extend helically relative to the rotation axis 208 of the first cutting element 204 and the second cutting element 206. In some embodiments and referring specifically to FIG. 4B, one or more of the second cutting blades 400 have a negative rake angle 402. Stated another way, one or more of the second cutting blades 400 has a rake angle 402 that is measured between an imaginary radius 404 extending from the rotation axis 208 of the second cutting element to a most radially distant edge 406 of the cutting blade 400 to a tangent 408 from an inner face 410 of the cutting blade 400 at the most radially distant edge 406. The rake angle 402 is in the opposite direction as the rotational direction 209 of the first cutting element 204 and the second cutting element 206 about the rotation axis 208. Stated yet another way, the inner face 410 of one or more of the second cutting blade 400 may slant outward or forward of the cutting edge. In some embodiments, the rake angle 402 is in a range of 5 degrees to 45 degrees (also referred to as −5 degrees to −45 degrees). In some embodiments, the rake angle 402 is in a range of 6 degrees to 35 degrees (also referred to as −6 degrees to −35 degrees). In some embodiments, the rake angle 402 is in a range of 8 degrees to 24 degrees (also referred to as −8 degrees to −24 degrees). In some embodiments, the rake angle 402 is substantially 16 degrees (that is, 16 degrees±2.5 degrees; also referred to as substantially −16 degrees (that is, −16 degrees±2.5 degrees)).

In some embodiments, the positive rake angle 302 of the first cutting element 204 and the negative rake angle 402 of the second cutting element 206 facilitate improved cutting efficiency and/or inhibit clogging of occlusive material in the housing 202. More specifically, in some embodiments the positive rake angle 302 of the first cutting element 204 facilitates cutting and conveying occlusive material toward the second cutting element 206 and the negative rake angle 402 of the second cutting element 206 facilitates displacing occlusive materially radially outwardly toward the housing 202 and proximally, thereby inhibiting clogging of occlusive material in the housing 202.

Figure 5A:
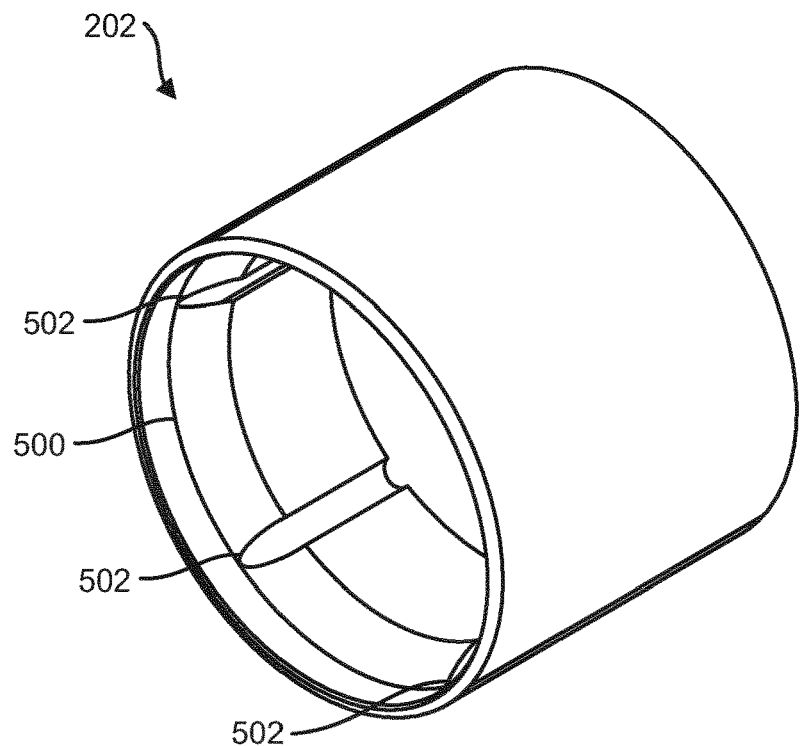
FIG. 5A is a perspective view of a cutter housing of the atherectomy system of FIG. 1.
Figure 5B:
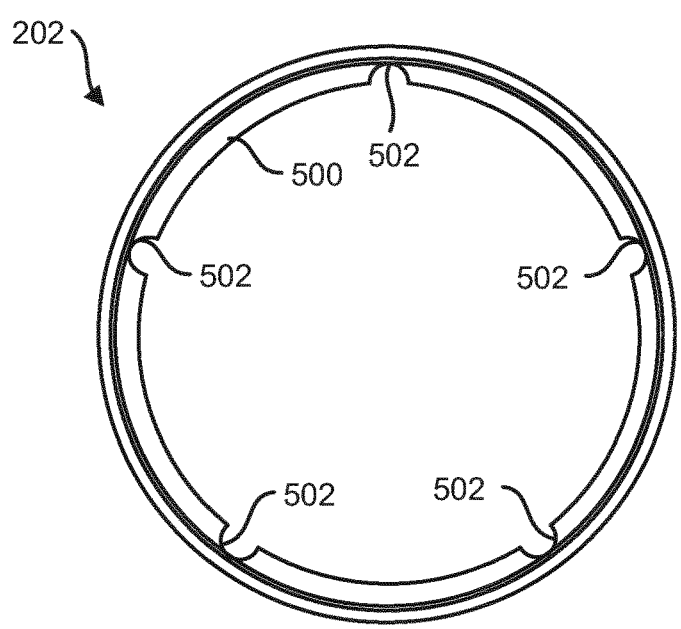
FIG. 5B is a front view of the cutter housing of FIG. 5A.

FIGS. 5A-5B illustrate the housing 202 of the cutter assembly 118. In some embodiments and as illustrated, the inner surface 500 of the housing 202 includes one or more shearing elements 502 that further macerate occlusive material. In some embodiments and as illustrated, the housing 202 includes five shearing elements 502. In other embodiments, the housing 202 includes a different number of shearing elements 502 (for example, one, two, three, four, five, six, seven, eight, nine, ten, or more shearing elements 502). In some embodiments, the shearing elements 502 are negative features (for example, channels formed on the inner surface 500 of the housing 202, as illustrated). In some embodiments, the shearing elements 502 are positive features (for example, ridges or protrusions extending from the inner surface 500 of the housing 202). In some embodiments and as illustrated, the shearing elements 502 extend in a direction substantially parallel to the rotation axis 208 (shown elsewhere—that is, parallel±10 degrees). In some embodiments, one or more of the shearing elements 502 do not extend in a direction substantially parallel to the rotation axis 208 (for example, one or more of the shearing elements 502 may extend helically relative to the rotation axis 208).

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An atherectomy device, comprising:
   a handle configured to be manipulated by a user;
   a catheter coupled to the handle, the catheter comprising an outer sheath and a drive shaft, wherein the drive shaft is disposed within and rotatable relative to the outer sheath; and
   a cutter assembly coupled to and extending distally relative to the outer sheath, the cutter assembly comprising:
      a housing non-rotatably coupled to and extending distally from the outer sheath, wherein the housing comprises an inner surface, and the inner surface comprises at least one shearing element;
      a proximal cutting element rotatably carried by the housing, the proximal cutting element being coupled to and extending distally from the drive shaft, the proximal cutting element comprising at least one proximal cutting blade, the at least one proximal cutting blade having a negative rake angle; and
      a distal cutting element being rotatable with the proximal cutting element relative to the housing, the distal cutting element comprising at least one distal cutting blade, the at least one distal cutting blade having a positive rake angle.

2. The atherectomy device of claim 1, wherein the proximal cutting element comprises a plurality of proximal cutting blades, each of the plurality of proximal cutting blades having the negative rake angle.

3. The atherectomy device of claim 2, wherein the distal cutting element comprises a plurality of distal cutting blades, each of the plurality of distal cutting blades having the positive rake angle.

4. The atherectomy device of claim 1, wherein the distal cutting element comprises a plurality of distal cutting blades, each of the plurality of distal cutting blades having the positive rake angle.

5. The atherectomy device of claim 1, wherein the negative rake angle is in a range of 8 degrees to 24 degrees.

6. The atherectomy device of claim 5, wherein the negative rake angle is substantially 16 degrees.

7. The atherectomy device of claim 1, wherein the positive rake angle is in a range of 40 degrees to 70 degrees.

8. The atherectomy device of claim 7, wherein the positive rake angle is substantially 55 degrees.

9. The atherectomy device of claim 1, wherein the inner surface comprises a plurality of shearing elements.

10. The atherectomy device of claim 1, wherein the at least one shearing element comprises a channel.

11. An atherectomy device, comprising:
    a handle configured to be manipulated by a user;
    a catheter coupled to the handle, the catheter comprising an outer sheath and a drive shaft, wherein the drive shaft is disposed within and rotatable relative to the outer sheath; and
    a cutter assembly coupled to and extending distally relative to the outer sheath, the cutter assembly comprising:
       a housing non-rotatably coupled to and extending distally from the outer sheath, wherein the housing comprises an inner surface, and the inner surface comprises at least one shearing element;
       a proximal cutting element carried by the housing, the proximal cutting
       element being configured to cut occlusive material when rotating relative to the housing about a rotational axis in a rotational direction, the proximal cutting element being coupled to and extending distally from the drive shaft, the proximal cutting element comprising at least one proximal cutting blade, the at least one proximal cutting blade having a first rake angle, the first rake angle extending from (i) a radius from the rotational axis to a most radially distant edge of the at least one proximal cutting blade to (ii) a tangent from an inner face of the at least one proximal cutting blade at the most radially distant edge, the first rake angle being in the opposite direction as the rotational direction; and
       a distal cutting element coupled to the proximal cutting element, the distal cutting element being configured to cut occlusive material when rotating with the proximal cutting element relative to the housing about the rotational axis in the rotational direction, the distal cutting element comprising at least one distal cutting blade, the at least one distal cutting blade having a second rake angle, the second rake angle extending from (iii) a radius from the rotational axis to a most radially distant edge of the at least one distal cutting blade to (iv) a tangent from an inner face of the at least one distal cutting blade at the most radially distant edge of the at least one distal cutting blade, the second rake angle being in the same direction as the rotational direction.

12. The atherectomy device of claim 11, wherein the proximal cutting element comprises a plurality of proximal cutting blades, each of the plurality of proximal cutting blades having the first rake angle.

13. The atherectomy device of claim 12, wherein the distal cutting element comprises a plurality of distal cutting blades, each of the plurality of distal cutting blades having the second rake angle.

14. The atherectomy device of claim 11, wherein the distal cutting element comprises a plurality of distal cutting blades, each of the plurality of distal cutting blades having the second rake angle.

15. The atherectomy device of claim 11, wherein the first rake angle is in a range of 8 degrees to 24 degrees.

16. The atherectomy device of claim 15, wherein the first rake angle is substantially 16 degrees.

17. The atherectomy device of claim 11, wherein the second rake angle is in a range of 40 degrees to 70 degrees.

18. The atherectomy device of claim 17, wherein the second rake angle is substantially 55 degrees.

19. The atherectomy device of claim 11, wherein the inner surface comprises a plurality of shearing elements.

20. The atherectomy device of claim 11, wherein the at least one shearing element comprises a channel.

* * * * *